US012592972B2

(12) United States Patent
Gracey

(10) Patent No.: US 12,592,972 B2
(45) Date of Patent: Mar. 31, 2026

(54) COMPUTING SYSTEM TO MANAGE SECURITY PROTOCOLS FOR MULTIPLE ELECTRONIC MESSAGING PROVIDERS BASED ON DOMAIN DELEGATION

(71) Applicant: Klaviyo, Inc., Boston, MA (US)

(72) Inventor: Joseph Gracey, San Francisco, CA (US)

(73) Assignee: Klaviyo, Inc., Boston, MA (US)

( * ) Notice: Subject to any disclaimer, the term of this patent is extended or adjusted under 35 U.S.C. 154(b) by 98 days.

(21) Appl. No.: 18/636,556

(22) Filed: Apr. 16, 2024

(65) Prior Publication Data

US 2025/0323945 A1      Oct. 16, 2025

(51) Int. Cl.
H04L 9/40 (2022.01)
G06Q 10/107 (2023.01)
H04L 61/4511 (2022.01)

(52) U.S. Cl.
CPC ........... H04L 63/20 (2013.01); G06Q 10/107 (2013.01); H04L 61/4511 (2022.05)

(58) Field of Classification Search
CPC .... H04L 61/4511; H04L 63/20; G06Q 10/107
See application file for complete search history.

(56) References Cited

U.S. PATENT DOCUMENTS

| | | | |
|---|---|---|---|
| 6,687,746 B1 * | 2/2004 | Shuster | ............... H04L 61/4511 707/999.005 |
| 10,536,426 B2 | 1/2020 | Blinn et al. | |
| 11,991,139 B2 | 5/2024 | Blank | |
| 2006/0200659 A1 | 9/2006 | Gillum | |
| 2007/0143469 A1 * | 6/2007 | Adams | .................. H04L 51/212 709/224 |
| 2010/0070569 A1 * | 3/2010 | Turakhia | ............. H04L 61/4511 709/203 |
| 2016/0179822 A1 | 6/2016 | Gupta et al. | |
| 2018/0212994 A1 * | 7/2018 | Yao | ........................... H04L 9/30 |
| 2020/0092257 A1 * | 3/2020 | Goldstein | ............. H04L 63/101 |
| 2021/0226951 A1 | 7/2021 | Goldstein et al. | |
| 2021/0289001 A1 | 9/2021 | Wilson et al. | |
| 2024/0348574 A1 | 10/2024 | Blank | |

* cited by examiner

*Primary Examiner* — Viet D Vu
(74) *Attorney, Agent, or Firm* — Batt IP A Law Corporation; Richard Batt

(57) ABSTRACT

A method for administering security protocols for sending bulk email from multiple email sending providers comprises obtaining control of the subdomain from the original domain owner. The method further includes assigning sub-subdomains (or additional nested domains) to each of the email sending providers and administering security protocols for each of the email sending providers based on the assigned sub-subdomains. In embodiments, the method further comprises generating content for and sending the bulk emails. Related systems are also described.

19 Claims, 7 Drawing Sheets

PRIOR ART

SUB-ENTITY ELECTRONIC MESSAGE INBOX DEVICES
52

INBOX SERVER
50

ESP SERVER
40

DNS SERVER
(authoritative)
24

INTERMEDIARY SERVER
30

ENTITY INPUT COMPUTING DEVICE
20

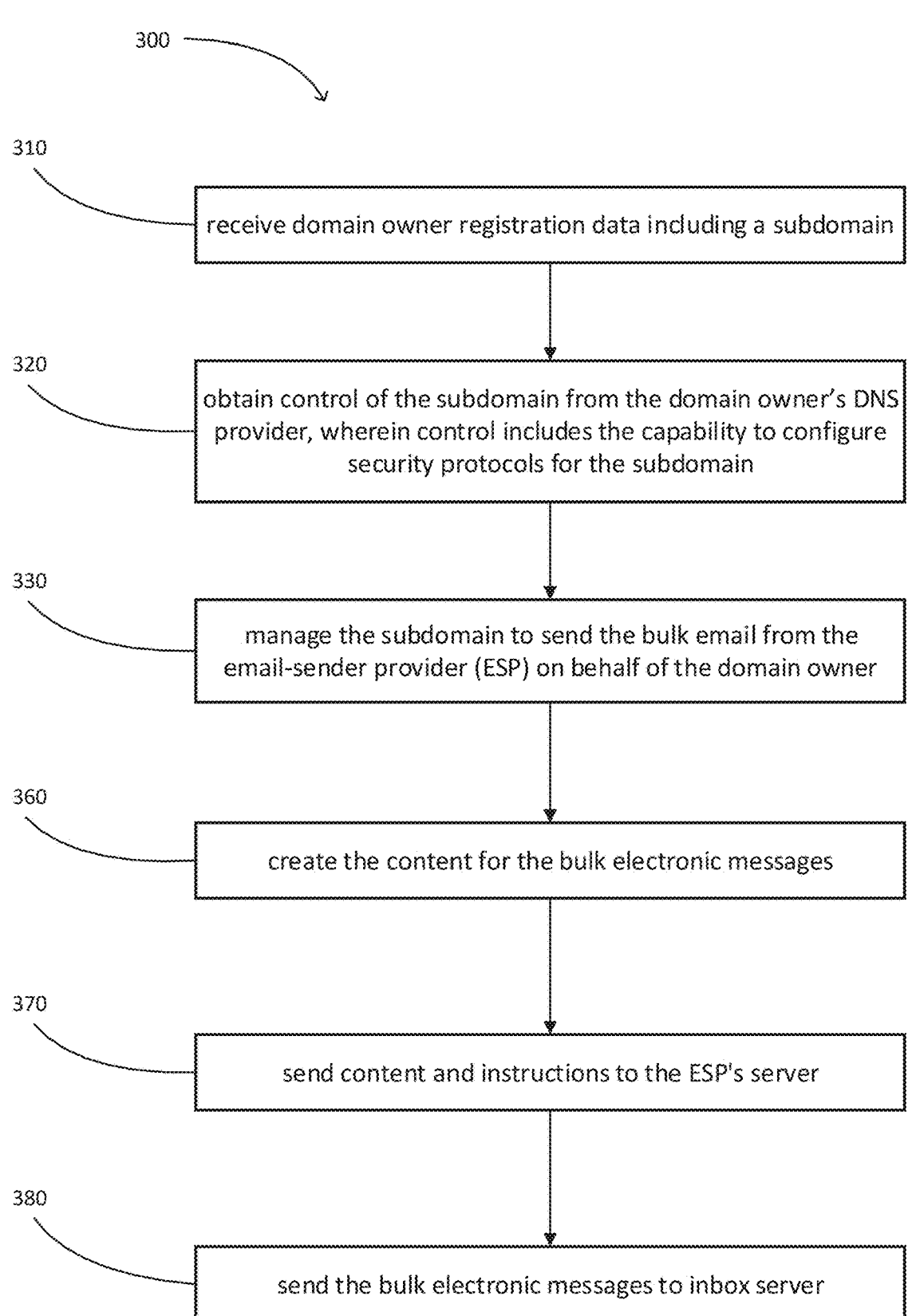

300

310 receive domain owner registration data including a subdomain

320 obtain control of the subdomain from the domain owner's DNS provider, wherein control includes the capability to configure security protocols for the subdomain

330 manage the subdomain to send the bulk email from the email-sender provider (ESP) on behalf of the domain owner

360 create the content for the bulk electronic messages

370 send content and instructions to the ESP's server

380 send the bulk electronic messages to inbox server

FIG. 3

500

520

Create hosted zone
522

User uploads NS records with own DNS provider
524

Intermediary performs validation to ensure control of subdomain
526

Intermediary has control of subdomain
528

User selects subdomain (e.g., "email" for email.brand1.com)
510

Each ESP is assigned non-conflicting subdomains (e.g., k1, k2, k3)
530 k1.email.brand1.com k2.email.brand1.com k3.email.brand1.com

Configure DNS records for ESP-1
542

Generate custom records for ESP-1
552

Upload to hosted zone and mark ESP-1 as configured
562

Configure DNS records for ESP-2
544

Generate records for ESP-2
554

Upload to hosted zone and mark ESP-2 as configured
564

Configure DNS records for ESP-3
546

Generate records for ESP-3
556

Upload to hosted zone and mark ESP-3 as configured
566

Administer security protocols for each ESP based on assigned subdomain
540

FIG. 5

COMPUTING SYSTEM TO MANAGE SECURITY PROTOCOLS FOR MULTIPLE ELECTRONIC MESSAGING PROVIDERS BASED ON DOMAIN DELEGATION

TECHNICAL FIELD

This generally relates to electronic messaging over the internet, and more particularly, to managing security protocols for bulk electronic messaging over the internet.

BACKGROUND

Industry standard email security and authentication protocols encompassing SPF, DMARC, DKIM and IP address resolution are critical to combating spam, preventing fraud and ensuring high deliverability.

Large inbox providers have also encouraged the adoption of email security protocols as a means to combat increasing amounts of spam and unwanted email. By requiring the email senders to adopt more stringent security policies, large inbox providers hope to decrease the abuse potential of shared reputation obtained by utilizing sending infrastructure with other parties.

Administering security policies for entities that engage in bulk email marketing is challenging because they do not typically have the experience, scale or engineering capacity to maintain email sending infrastructure, in terms of physical machines to schedule and send mail, nor in terms of digital resources related to IP addresses and email security protocols. For example, the number of email recipients may exceed several million emails per day. Much of today's electronic messaging (e.g., emails), therefore, is sent via a specialized email sending provider (ESP).

Traditional approaches for configuring email security protocols involve careful communication and coordination through multiple steps and multiple entities. With reference to FIG. 1, for example, a traditional way of configuring email security protocol is summarized below.

Step 1. An entity computing device (e.g., a domain owner engaged in selling goods or services) 20 provides its domain name and desired sending domain to the third-party marketing company (also referred to herein as the "intermediary") 30.

Step 2. The intermediary 30 generates and returns the DKIM and SPF security protocols, either as TXT records to the domain owner 20 or, optionally, returns CNAME (redirect) records to an alternate hosting location.

Steps 3/4. The domain owner 20 logs into its domain registrar 24 (also referred to herein as the domain owner's DNS provider or DNS server) and uploads these records and confirms completion of the upload with the intermediary 30.

Step 5. The intermediary 30 validates these DNS records. To validate the DNS records, the intermediary queries the DNS server for whether the DNS server replies with the correct IP address for the subdomain. It can take more than 24 hours, and sometimes up to 72 hours or more to resolve these records.

Step 6. If the intermediary 30 utilizes an email sending provider (ESP) 40, the ESP will also be compelled to conduct its own validation for whether the DNS server replies with the correct IP address for the subdomain.

Step 7. The ESP sends bulk emails to the inbox server 50, and the inbox server distributes the emails to individual inboxes of the domain owner's customers 52.

If the intermediary 30 wishes to modify any particulars of the security/authentication protocols, it must once again coordinate with both the domain owner 20 and all ESPs 40 to have the domain owner modify the DNS records and revalidate the configuration with the ESP. As described above with reference to step 5, this step can cause great delay.

Accordingly, a method and system that addresses the above-mentioned challenges is desired.

SUMMARY OF THE INVENTION

A computer-implemented method for administering security protocols for sending bulk email from one or more email sending providers comprises: receiving a name for a subdomain; obtaining control, via a server or computer framework, of the subdomain from the DNS server, wherein control includes the capability to configure security protocols for the subdomain; assigning, via the server or computer framework, a unique sub-subdomain to each ESP; and administering, via the server or computer framework, the subdomain to send the bulk email from the at least one ESP, wherein the administering comprises configuring security protocols for each ESP based on the assigned sub-subdomain and without updating the security protocols with the DNS server.

In embodiments, the obtaining control comprises creating at least one nameserver zone for holding DNS records for the subdomain.

In embodiments, the obtaining control comprises sending to the DNS server NS records containing the name of the at least one nameserver zone.

In embodiments, the obtaining control comprises, after the NS records of the at least one nameserver zone has been uploaded to the DNS server, verifying that the DNS server gives the name to the at least one nameserver zone. In embodiments, the verifying is performed by directly querying the nameserver zone.

In embodiments, the security protocols comprise DNS records, and wherein the administering comprises generating DNS records for each of said at least one ESP, after the DNS records are configured for the at least one ESP.

In embodiments, the administering comprises uploading DNS records to the at least one nameserver zone.

In embodiments, the DNS records comprise at least one authentication protocol selected from the following: SPF, DKIM, and DMARC.

In embodiments, the method further comprises generating content for the bulk email.

In embodiments, the method further comprises sending the content and sending instructions to the ESP. Examples of sending instructions include, without limitation, the 'from' address, tracking domains, and metadata.

In embodiments, the administering comprises adding an ESP and generating security protocols for the added ESP without updating the security protocols with the DNS server.

In another embodiment of the invention, a system for securely sending bulk emails from at least one email sending provider (ESP) to an inbox server comprises a server arrangement including: an entity-register module programmed and operable to receive registration data including a subdomain; a record-holder delegate module programmed and operable to delegate control of the subdomain from the DNS server to an intermediary; a manage-ESP module for managing the subdomain to send the bulk email from the at least one ESP.

In embodiments, the manage-ESP module is programmed and operable to: assign a different sub-subdomain to each of the at least one ESP; adjust the number of ESPs to send the bulk email based on the assigned sub-subdomain; and administer security protocols for each ESP based on the assigned sub-subdomain and without updating the security protocols with the DNS server.

In embodiments, the record-holder delegate module is programmed and operable to create at least one nameserver zone for holding DNS records for the subdomain.

In embodiments, the record-holder delegate module is programmed and operable to send to the DNS server NS records of the at least one nameserver zone.

In embodiments, the record-holder delegate module is programmed and operable to, after the NS records of the at least one nameserver zone has been uploaded to the DNS server, verify that the DNS server gives the name to the at least one nameserver zone.

In embodiments, the record-holder delegate module is programmed and operable to verify by directly querying the nameserver zone instead of the DNS server.

In embodiments, the security protocols comprise DNS records, and wherein the manage-ESP module is programmed and operable to administer by generating DNS records for each of said at least one ESP, after the DNS records are configured for the at least one ESP.

In embodiments, the manage-ESP module is programmed and operable to administer by uploading the DNS records to the at least one nameserver zone.

In embodiments, the server arrangement further comprises a content generator programmed and operable to create content for the bulk emails.

In embodiments, the server arrangement is further programmed and operable to send the content and sending instructions to the ESP.

In embodiments, the manage-ESP module is programmed and operable to administer by adding an ESP and generating security protocols for the added ESP without further updating the security protocols with the DNS server.

In another embodiment of the invention, a method for securely sending bulk email from one or more email sending providers comprises delegating control of a subdomain to an email sender intermediary.

In embodiments, the server or computer framework is a cloud server or cluster of nodes.

In embodiments, when multiple ESPs are used to send bulk emails, the method comprises assigning a unique additional nested (or sub) domain level to the existing sending domain for each of the ESPs, wherein multiple sending identities are maintained on behalf of the domain owner via the assigned multiple additional nested domains.

In embodiments, the method further comprises administering security protocols according to different types of email and for each of the email sending providers based on the assigned sub-subdomains.

In embodiments, the method comprises associating each sub-subdomain with an individual IP address, optionally, using PTR records.

In embodiments, the administering comprises configuring each sub-subdomain with DKIM and SPF policies for a specific purpose or for the ESP associated with the sub-subdomain.

Objects and Advantages

Embodiments of the invention have a variety of objects and advantages.

For example, an embodiment of the invention significantly streamlines the process to add, remove, and generally manage multiple ESPs.

In embodiments of the invention, security protocols can be adjusted and sub-subdomains can be added to expand capacity or segment-sending without further involvement from the domain owner.

Embodiments of the invention are flexible and extensible: they allow for an arbitrary number of independently manageable sub-subdomains, wherein use of the sub-subdomains permit the intermediary to configure independent DKIM and SPF policies according to different types of email and also to permit redundant sending capability across an arbitrary number of email-sending providers.

Embodiments of the invention provide for verifying/resolving the subdomain delegation quickly by directly querying the authoritative nameserver instead of the public DNS server, thereby bypassing the public server and cache, saving 24-72 hours or more.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 3 is a flowchart of an overview of a process for sending bulk email, according to one or more embodiments of the present invention;

FIG. 5 is a flowchart of delegating and managing the DNS records for ESPs, according to one or more embodiments of the present invention;

DETAILED DESCRIPTION

Figure 1:
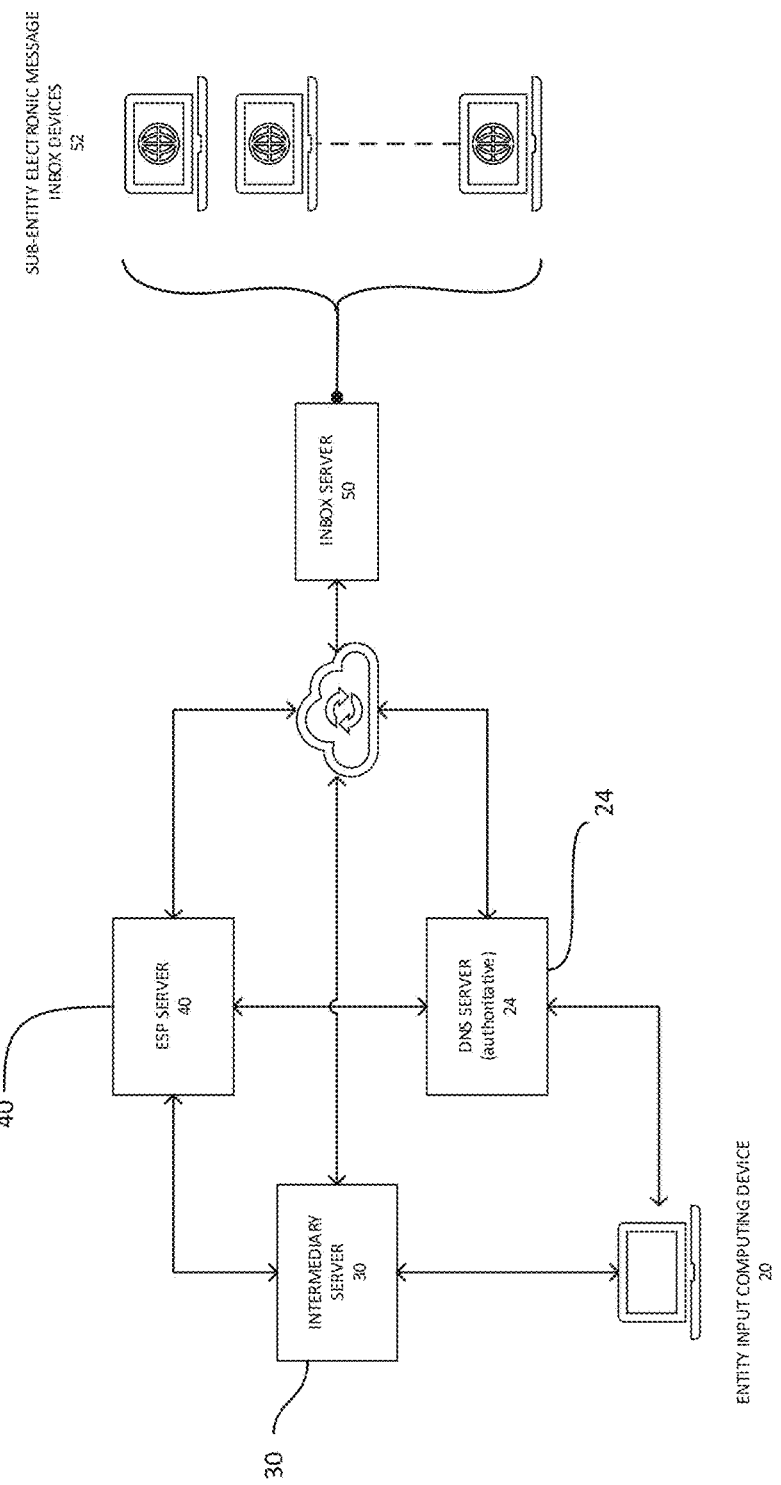
FIG. 1 shows a schematic diagram of a traditional server framework for sending bulk electronic messages.

Before the present invention is described in greater detail, it is to be understood that this invention is not limited to particular embodiments described, and as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

All existing subject matter mentioned herein (e.g., publications, patents, patent applications and hardware) is incorporated by reference herein in its entirety except insofar as the subject matter may conflict with that of the present invention (in which case what is present herein shall prevail).

Definitions

The following definitions are intended to be illustrative and not limiting except where the context indicates otherwise or except as specifically recited in the appended claims.

DNS. By 'DNS' it is meant the Domain Name System.

DNS records. DNS records are instructions stored in the DNS (authoritative) servers and provide information about a domain including security protocols. They use DNS syntax to tell the internet how to handle requests for that domain, such as what IP address is associated with it, where to find the website, and how to interact with it. Examples of DNS records include, without limitation, the A record, CNAME, PTR record, and TXT record.

PTR record. A PTR (pointer) record maps an IP address to a domain name. It converts an IP address back to a name. In a reverse DNS lookup, a PTR record helps verify that the sender's IP address matches the claimed domain name.

Domain. A domain has a hierarchical format, beginning at a top level (or $1^{st}$ level) domain, and can be arbitrarily extended with one or more domain name levels. An example of a domain name is 'example.com' where 'example' is the $2^{nd}$ level domain name and '.com' is the $1^{st}$ or top level domain.

Subdomain. A subdomain (or nested domain) is an optional extension or add-on to a domain or to another subdomain. It can function as a separate website within the overall domain infrastructure. For example, if the domain name is 'example.com', a subdomain could be 'email.example.com' where 'email' is the add-on.

Sub-subdomain. A sub-subdomain is an additional optional extension or add-on to a subdomain. It can also function as a separate website within the overall domain infrastructure. For example, if the current subdomain level is identified as 'email.example.com', a sub-subdomain could be 'test.email.example.com' where 'test' is the optional add-on. In this example, the sub-subdomain 'test' can be referred to as a 4th level domain (or 2nd level subdomain of example.com). To further illustrate by way of example, if the original subdomain is identified as 'test.email.example.com', a sub-subdomain could be 'k1.test.email.example.com' where 'k1' is the optional add-on corresponding to the sub-subdomain. To this end, it is to be understood that any number of additional nested domains, subdomains, or sub-subdomains (up to level n where n=1 to ∞) can be added to the originally-identified domain level.

Email Sending Provider. An email sending provider (ESP) is an entity that facilitates the sending and management of bulk emails.

Nameserver. The nameserver (sometimes referred to herein as "NS") is the authoritative server in the DNS that translates domain names into IP addresses. Nameservers store and organize DNS records, each of which, amongst other things, pairs a domain with one or more IP addresses.

NS Record. An NS record indicates which server is authoritative for a specific domain. The NS record points to the nameserver that contains the actual DNS records for that domain.

SPF. SPF stands for Sender Policy Framework. It's an email authentication method that helps identify the mail servers that are permitted to send email from a particular domain. Using this validation protocol, ISPs can determine when spoofers and phishers are trying to forge emails from your domain to send malicious email to your users. The technology involves: (1) the domain owner publishes this information in a record in the domain's DNS zone, and when someone else's mail server receives a message claiming to come from that domain, then (2) the receiving server can check whether the message complies with the domain's stated policy.

DKIM. DKIM (DomainKeys Identified Mail) is a cryptographic technology that senders can use to "sign" their messages with. DKIM allows the receiver of an email message to check if that message was authorized and sent by the sender responsible for the domain. When messages are not signed with DKIM, inbox providers can block messages and prevent them from being delivered to recipients. Steps for DKIM include: (a) A sender adds a private key on their mail servers and signs the message. (b) The receiving server checks the public key stored in the txt record of dkimselector._domainkey.domain.com to validate the private key added by the sender.

DMARC. DMARC is an email authentication protocol that helps to prevent email spoofing, which is a technique used by attackers to impersonate the sender of an email. DMARC works by verifying the sender's identity using SPF and DKIM. DMARC also allows domain owners to publish a policy in their DNS records that specifies how to handle messages that fail authentication or alignment. For example, they can choose to reject, quarantine, or mark as spam those messages.

Described herein are various methods and systems for sending electronic messages.

Figure 2:
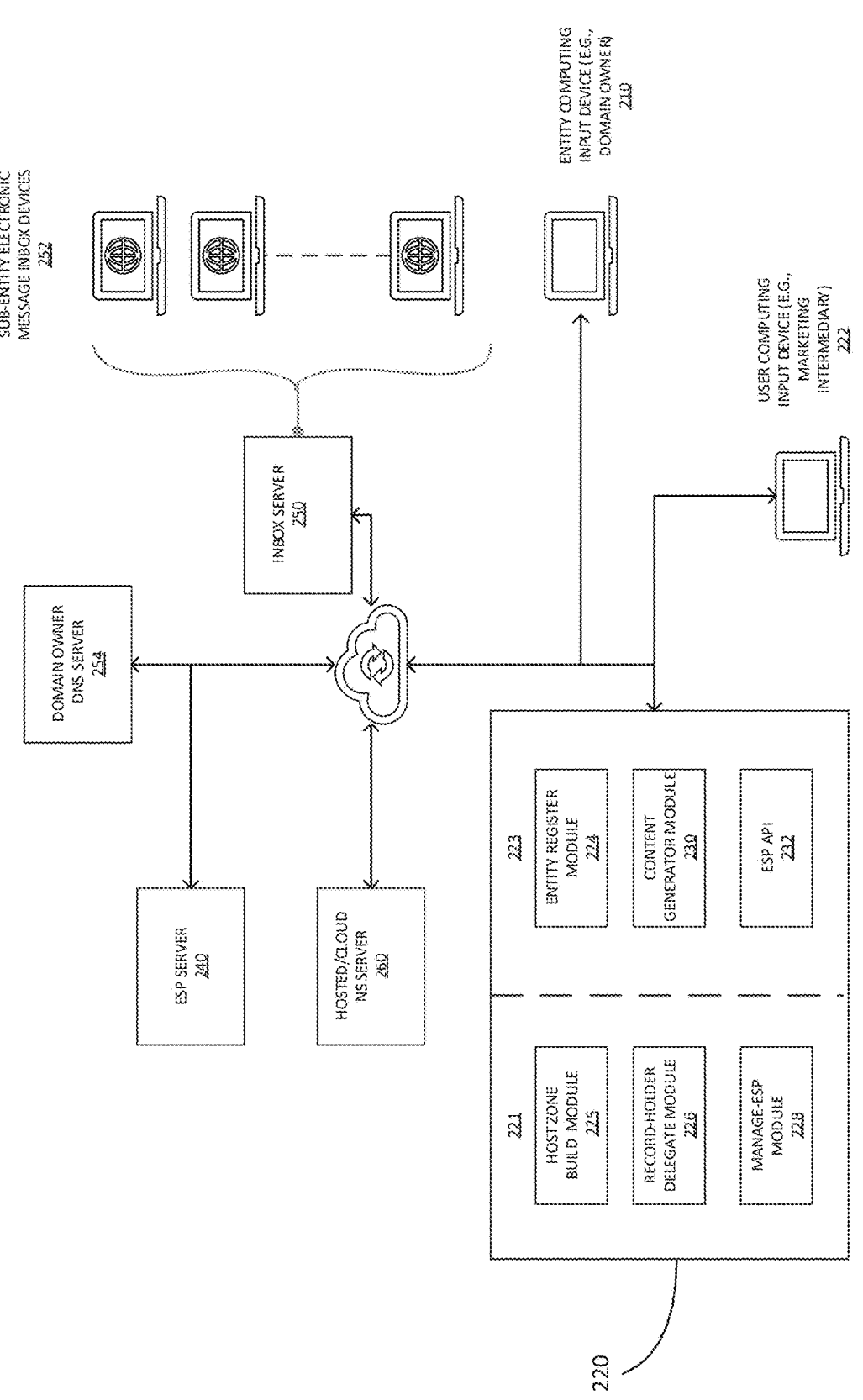
FIG. 2 shows a schematic diagram of a server framework for sending bulk electronic messages, according to one or more embodiments of the present invention.

FIG. 2 is a schematic diagram of a flexible bulk electronic messaging system 200 in accordance with embodiments of the invention. The system 200 shown in FIG. 2 includes a backend server arrangement or framework 220 having top level 223 and lower level 221 modules programmed and operable to interface with an input device of the domain owner 210, the marketing or intermediary user 222, ESP server 240, and hosted NS server 260. As described herein with reference to FIGS. 3-6, the system automatically delegates ownership of the DNS records to the intermediary, and provides ESP management to the intermediary without requiring additional file transfers or permissions from the domain owner in order to add, remove, and change ESPs for delivering bulk email to the inbox server 250, and ultimately to the individual message inboxes 252.

FIG. 3 is an overview of a flowchart of a flexible bulk electronic messaging method 300 in accordance with embodiments of the invention.

Step 310 states to receive domain owner registration data. With reference to FIG. 2, step 310 can be performed by, for example, the entity register module 224 of the backend server 220. The entity register module 224 is programmed and operable to prompt and receive information from the domain owner's computing device 210. Examples of registration data include without limitation the ID, name, domain name, subdomain, and other information relating to the customer identity and marking preferences.

Step 320 states to transfer or delegate control of the DNS records from the domain owner to the intermediary. This step can be performed by the backend server framework 220, described further herein in connection with FIG. 2 where hostzone build module 225 creates at least one hosted nameserver zone to store DNS records for the selected subdomain from step 310. The delegate module 226 is programmed and operable to request the domain owner to upload or publish the NS records to its DNS server (e.g., DNS server 254 shown in FIG. 2). The delegate module 226 then validates or verifies NS records have been properly uploaded to the domain owner's DNS server.

Step 330 states to manage the number of ESPs for the domain owner. As described herein, this step can be performed by the manage-ESP module to add, remove or replace ESPs-without additional work on the part of the domain owner.

Step 360 states to create the content for the bulk electronic messages. This step may be performed by content generation module 230 in combination with the marketing service provider or intermediary 222. In embodiments, a template-creating module (not shown) is operable to provide a wide range of email templates with content customized to the email recipients. The template-creating module can include various tools and a UI for the domain owner to provide input, modifications, and approval. The type of content can vary widely. Examples of content include, without limitation, email templates, illustrations, media, and customizations desired by the domain owner to market to the email recipient (e.g., a customer of the domain owner).

Step 370 states to send the content and instructions to the ESP server. This step may be performed by an ESP API 232, operable to communicate with the ESP server 240, and to send the content, described above, from the content generator 230 to the ESP server 240. The ESP API 232 is also operable to send instructions to the ESP server including, for example, delivery time, sending domain, and DNS-related instructions such as DKIM, SPF, and DMARC authentication protocols.

Step 380 states to send the bulk electronic messages to the inbox server. This step can be performed by the ESP server 240 preparing and sending the bulk emails to the inbox server 250. The ESP server 240 applies security protocols including use of the DNS records on the DNS server 254/hosted server 260. Examples of the security protocols on file include, without limitation, the IP Address, DKIM, SPF and DMARC.

In embodiments of the invention, the ESPs verify the security protocols by checking for: (a) the presence of DKIM keys, (b) the existence of MX records that identify their mail server, and c) the SPF policy that also identifies their mail server.

Figure 4:
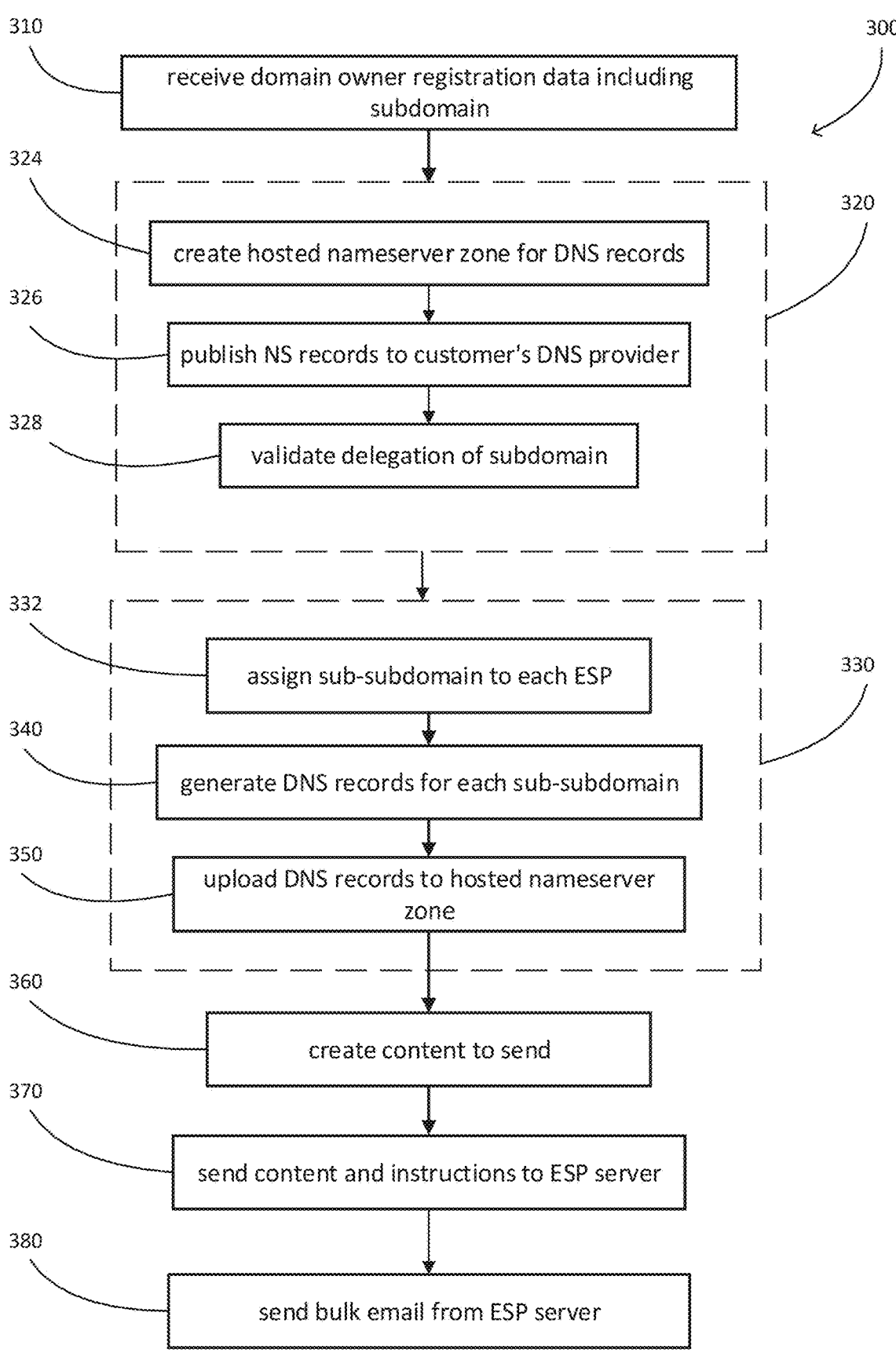
FIG. 4 is a flowchart of a process for sending bulk email, according to one or more embodiments of the present invention.

FIG. 4 is another flowchart of a flexible bulk electronic messaging method 300 in accordance with embodiments of the invention. The method shown in FIG. 4 is the same as the method shown in FIG. 3, except step 320 and step 330 are broken out into additional sub-steps in accordance with embodiments of the invention.

Particularly, step 320, which is for transferring or delegating control of the DNS records from the domain owner to an intermediary such as a marketing party includes the substep 324 of creating a hosted nameserver zone for the DNS records. This step may be implemented by a backend server framework 220 and the hostzone module 225 to automatically create a hosted zone for the selected subdomain for sending email. In embodiments, a plurality of subdomains (e.g., 2-10 subdomains, more typically 4-6 subdomains) are created in the hosted zone for the DNS records.

Next, and with reference to step 326, the domain owner publishes or uploads the NS records for the newly hosted zone to the domain owners DNS server/provider (e.g., DNS server 254 shown in FIG. 2). This step may be implemented by the delegate module 226 of the backend server 220 shown in FIG. 2 whereby the domain owner is prompted to provide the DNS provider information and the delegate module is programmed and operable to upload the DNS records, and according to step 328, validate delegation of subdomain. Once it is verified that the DNS server 254 provides the domain of the NS server 260, the transfer or delegation of control of the DNS records is complete.

Next, after delegation has been completed, the ESPs are managed or modified according to the process set forth in step 330.

Step 332 states to assign a sub-subdomain to each ESP. This step can be performed or implemented by the manage-ESP module 228 shown in FIG. 2 whereby the ESP module is programmed and operable to create and assign a unique sub-subdomain to each ESP.

Sep 340 states to generate DNS records for each sub-subdomain. This step is performed by the ESP manage module 228 where DNS records are generated according to the sub-subdomain and specific for the particular ESP.

In embodiments, a plurality of ESPs is identified and a unique sub-subdomain is assigned to each of the plurality of ESPs. DNS records are generated for each ESP.

Step 350 states to upload the DNS records to the host nameserver zone. This step can be performed by the mange ESP module 228. The manage-ESP module is programmed and operable to upload each of the DNS files to the hosted NS server 260.

The delegation of the DNS records and the management of the ESPs is now complete and the method then proceeds to steps 360-380, which can be performed as described above in connection with FIG. 3 to securely deliver bulk email from the ESP server 240.

FIG. 5 is an exemplary method 500 illustrating the domain owner of 'brand1.com' delegating control of its DNS files, and allowing the intermediary to manage the ESPs in accordance with embodiments of the invention.

Step 510 is user registration and prompts the user to select a subdomain, e.g. the user selects and enters the subdomain 'email.brand1.com.' As discussed above with reference to FIG. 2, the registration step may be performed by the entity register module 223 of the backend server 220 whereby the domain owner enters the registration information via the computing device 210.

Step 520 is delegation.

The delegation process is commenced according to step 522. A hosted nameserver zone is created. As discussed above with reference to FIG. 2, the host zone creation step may be performed by the host zone build module 225. For example, a set of nameservers (sometimes referred to as NS servers) is created (each having a type, name and value) on a cloud-based server platform, or white label servers, a nonlimiting example of which is the Amazon Web Services Route 53 (AWS/R53) server platform. With reference to step 522, the newly created hosted zone includes: NS email ns1.klaviyo.com; NS email ns2.klaviyo.com; NS email ns3.klaviyo.com; and NS email ns4.klaviyo.com.

Step 524 states for the user to upload the NS records to its own DNS provider. The NS records indicate the server location which will hold the DNS records and, in this example, shall be the hosted zone created in step 522. As discussed above with reference to FIG. 2, the delegate module 225 may be programmed and operable to facilitate the user to publish or upload the NS records to its own DNS provider.

Step 526 states to validate the delegation of the NS records from the original DNS provider to the new hosted zone, namely, to resolve or confirm the DNS server provides the domain to the new hosted zone.

In embodiments, this step is performed relatively rapidly by querying the hosted zone nameserver directly, thereby bypassing the recursive (typically public) DNS server and/or the DNS server's cache or another intermediate server, which may not have updated records for 48-72 hours. In embodiments, verification is performed by, beginning with the root domain (e.g., "."), querying for the next domain level for its authoritative nameserver, and using the resultant authoritative nameserver to obtain the next domain level, and continuing to query and use each subsequently obtained authoritative nameserver until the target domain is reached.

The target domain (or nameserver zone) should now reply to the query with a correct list of NS records or, if the verification is incomplete, a subset of the entire list of NS records, or if the verification fails, the text 'none'.

In embodiments, verification further comprises verifying a name or ID of the domain owner being authorized to use the subdomain. This step may be performed by including in a separate TXT record the name or ID of the party permitted to use the subdomain. Verification is confirmed if the query returns the name of the party in the text record.

Step 528 states that the intermediary now has control or owns the DNS records for the subdomain. In method 500, the intermediary now controls the DNS records for the subdomain email.brand1.com.

Step 530 states to assign non-conflicting sub-subdomains to the ESPs. As described above with reference to FIG. 2, this step may be performed by the Manage-ESP module 228 in which the Manage-ESP module is programmed and operable to create and assign the sub-subdomains to the ESPs. Examples of non-conflicting sub-subdomains are, without limitation, k1.email.brand1.com; k2.email.brand1.com; and k3.email.brand1.com. Examples of ESPs are, without limitation, Twilio SendGrid, Sparkpost, and MailChimp.

Step 540 states to administer the security protocols for each ESP based on the assigned sub-subdomain. With reference to steps 542, 544, and 546, the DNS records for each ESP can be configured according to the ESP's requirements.

ESPs can have a multitude of implementation differences. For example, DKIM and SPF selectors can be self-hosted via TXT records. This step may be performed by the Manage-ESP module 228 in which the Manage-ESP module is programmed and operable to work the ESP to obtain its DNS record requirements.

Steps 552, 554, and 556 state to generate the custom DNS records for each of the ESPs, and can prompt the user to create and assign the sub-subdomains to the ESPs.

Steps 562, 564, and 566 states to upload to the hosted zone (e.g., the AMS R53 server platform) and to mark the ESP as configured.

In embodiments, each of ESP-managing steps can be performed by the manage-ESP module 228 of FIG. 2 in which the manage-ESP module is programmed and operable to the assign non-conflicting sub-subdomains to the ESPs, configure the DNS records for each ESP, generate the ESP records for each ESP, and upload the DNS record to the hosted zone with minimal or no input from the users.

In the embodiment illustrated in FIG. 5, the output from the ESP managing steps is three configured ESPs wherein the DNS records for each of the ESPs are held on the hosted zone which is controlled by the delegated intermediary. Additionally, because each of the ESPs have been assigned non-conflicting sub-subdomains, ESPs may be conveniently added and removed without burdening the domain owner nor DNS provider, discussed further herein. It is to be understood that while only three configured ESPs are shown in FIG. 5, the invention is not intended to be so limited and any number of ESPs may be conveniently configured and added to the system using the steps and components described herein.

Figure 6:
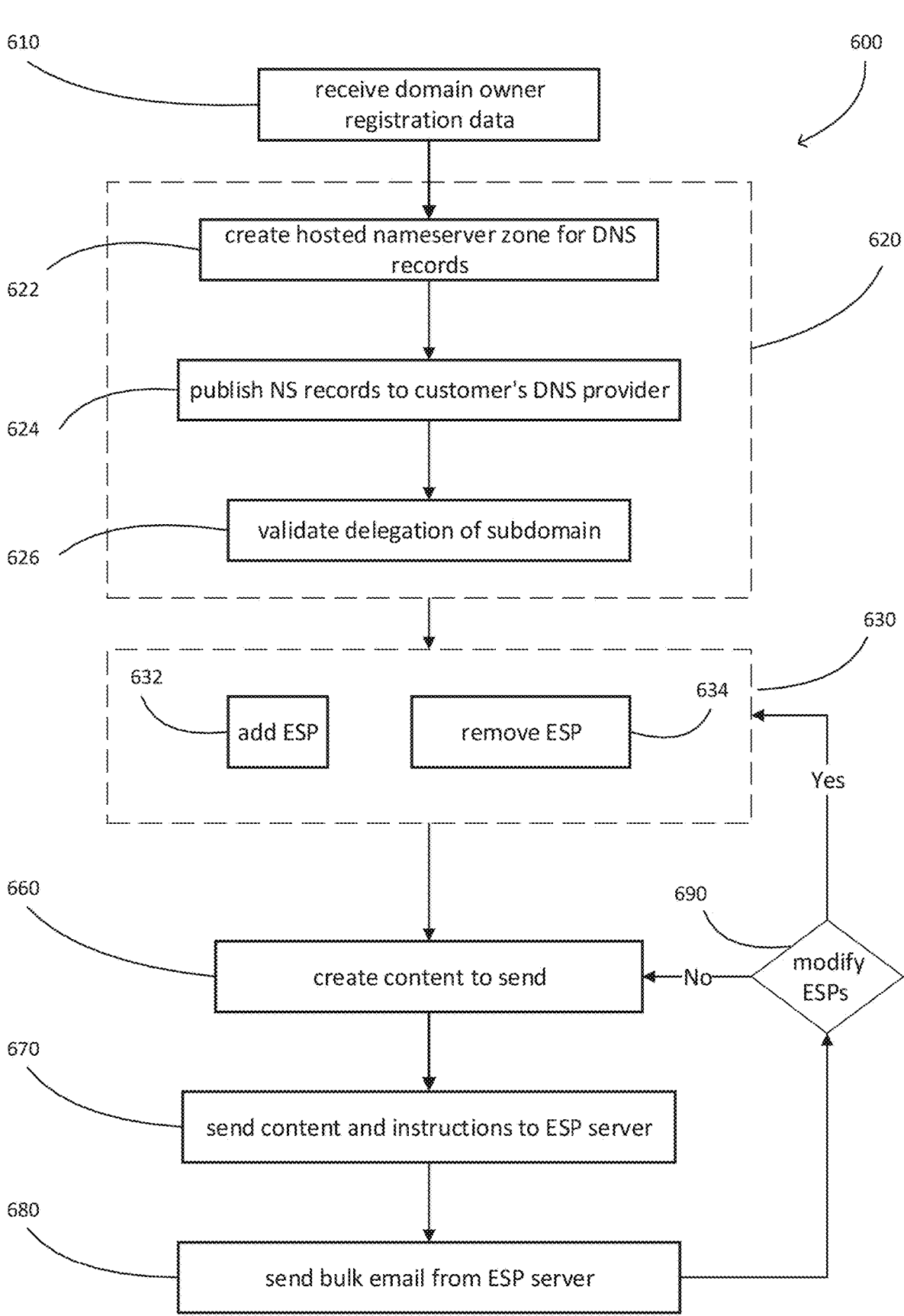
FIG. 6 is a flowchart of a process for managing ESPs for sending bulk email and through multiple phases, according to one or more embodiments of the present invention.

FIG. 6 is another flowchart of a method for adding, and optionally removing one or more ESPs from the bulk email messaging system in accordance with embodiments of the invention.

The method 600 can proceed through registration 610 and delegation 620 the same as the methods described herein.

Step 630, however, includes adding an ESP 632 and optionally removing an ESP. In embodiments of the invention, one or more ESPs are added during a first phase. The ESPs can be added as described above in connection with FIGS. 3-5.

The method then proceeds sequentially through steps 660-680, during the first phase, to send the bulk emails from the ESP servers.

Step 690 then queries whether the ESPs should be modified. For example, the intermediary (or domain owner) may desire to change an ESP because of security protocols, quality control, computing resources, cost, etc.

If yes, the process returns to step 630 where an ESP is added or removed as described herein.

In embodiments, ESPs are added or removed by the Manage-ESP module 228. In embodiments, the user is prompted via a UI or App on their input computing device for an ESP to add or remove. For example, the Manage-ESP module 228 is programmed and operable to receive the user instruction from the input device to remove an ESP and deletes the associated DNS records which were previously uploaded to the hosted server zone (e.g., server 260 shown in FIG. 2).

Advantageously, the domain owner need not add or remove files from its DNS server (e.g., DNS server 254) because the domain owner has delegated ownership of its DNS records to the intermediary as described herein, in particular, the DNS files are now held in hosted zone 260 controlled by the intermediary and are configured by non-conflicting sub-subdomains for each ESP.

If no adjustment is desired to the existing ESPs, the process returns to step 660.

In either case, the process returns to step 660 to create content, send the content and instructions to the adjusted or phase two ESPs, and ultimately send the bulk email from the ESP servers according to steps 660-680.

In embodiments, this process is repeated through multiple phases (e.g., phase one, phase two, . . . phase n) to send bulk email from a continuously evolving group of ESPs, and without the domain owner updating its DNS records on its DNS server.

Figure 7:
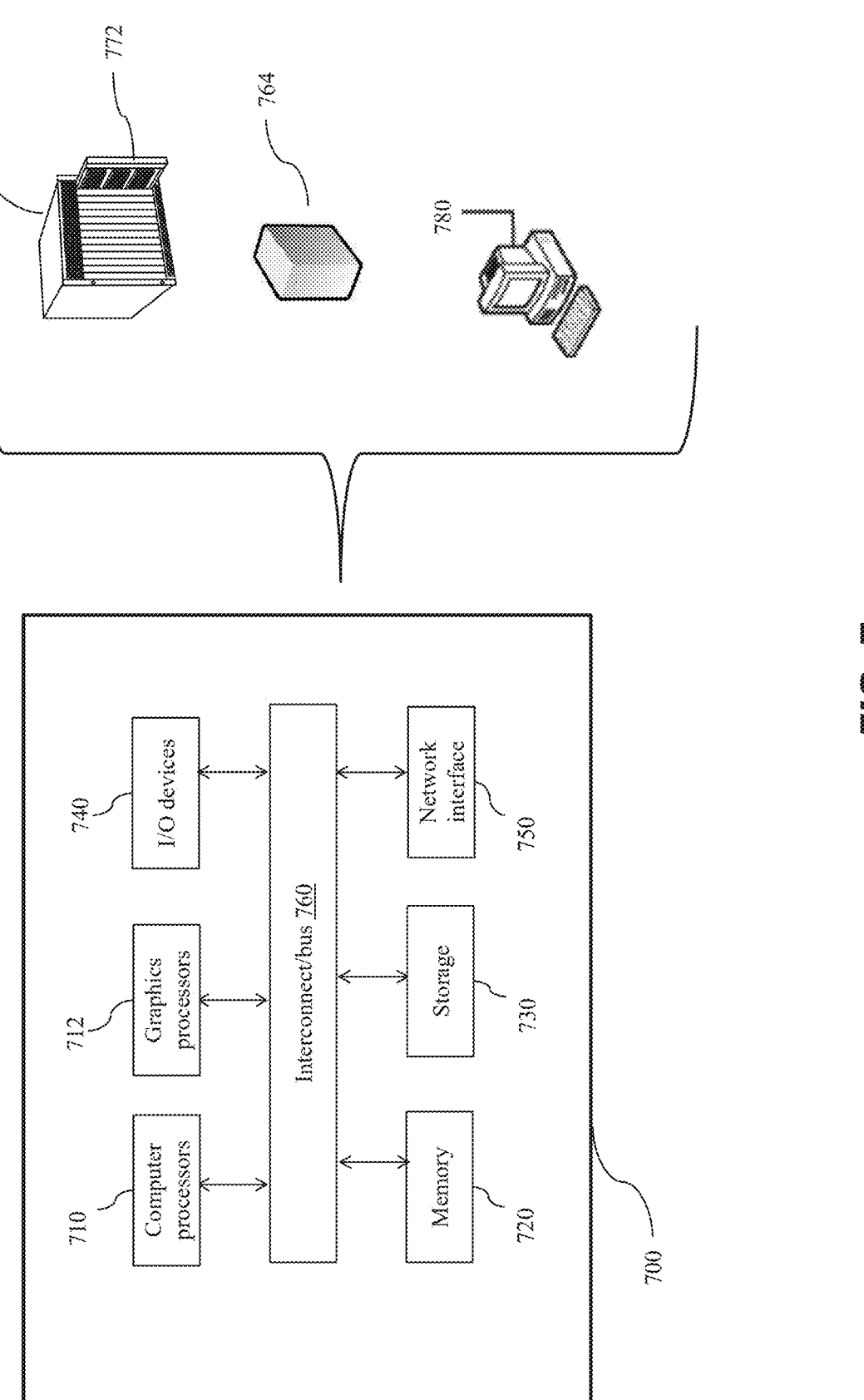
FIG. 7 is a block diagram of a server arrangement or computing system that can implement techniques described herein, according to one or more embodiments of the present invention.

FIG. 7 is a block diagram of a computing system 700 used to implement the techniques/processes described herein in accordance with embodiments of the invention. The computing device 700 is intended to represent various forms of digital computers, such as servers 764, 774, workstations, desktops 780, laptops, and other types of computing devices. The components shown here, their connections and relationships, and their functions, are meant to be exemplary only, and are not meant to limit implementations of the inventions described and/or claimed herein.

The computing device 700 is shown including: a computer processor 710, graphic processor 712, memory 720, storage 730, input output devices 740 and network interface 750.

The processors 710, 712, memory 720, storage 730, and network interface 750 are interconnected using various interconnect busses 760, and may be mounted on a common motherboard or in other manners as appropriate. The processor(s) can process instructions for execution within the computing device 700 to carry out the operations described herein, and including instructions stored in the memory 720 to display graphical information for a GUI on a display unit coupled to the network interface, I/O ports, or dedicated video card (not shown).

The memory 720 stores information within the computing device 700. In some implementations, the memory 720 is a volatile memory unit or units. In some implementations, the memory 720 is a non-volatile memory unit or units. The memory 720 may also be another form of computer-readable medium, such as a magnetic or optical disk.

The storage device 730 can provide mass storage for the computing device 700. In some implementations, the storage device 730 may be or contain a computer-readable medium, such as a hard disk device, an optical disk device, a tape device, a flash memory or other similar solid state memory device, or an array of devices, including devices in a storage area network or other configurations.

In some implementations, a computer program product may also contain instructions that, when executed, perform one or more methods, such as those described above. The computer program product can also be tangibly embodied in a computer- or machine-readable medium or media, such as the memory 720 or the storage device 730.

The input/output devices 740 are connected to the system via an input/output interface. Input/output devices can be internal or external and include, without limitation, sensors such as touch screen sensors, geolocation receivers, microphones, speakers, keyboard, mouse, printer, biometric readers, Bluetooth peripherals, cameras, external hard drives, and USB devices to communicate with the internal components of the computing device.

In some embodiments, a user, entity, or sub-entity behavior or selection may be obtained or sensed by the input output devices, and used to generate content by forming marketing segments, audience memberships, determine membership change events, and select metrics as described herein. Additionally, behavior (e.g., clicked or opened) may be detected based on use of a tracking tool. Examples of tracking tools include, without limitation, embedding pixels (or links) in the email content of the emails sent to the sub-entity. This tracking information and behavior can be used to generate content such as reports and metric information for use by the entity, and optionally, the user.

Network interface 750 can include various communication ports (e.g., USB, Bluetooth, Ethernet, wireless Ethernet). The network interface 750 can allow the processors to access the Internet through wired or wireless connections such as WiFi, 3G, 4G long-term evolution (LTE), 5G, UWB, and other wireless interface standard radios as well as Ethernet connection hardware.

The computing device 700 may be implemented in a wide variety of different forms. For example, it may be implemented as a standard server 764 or a desktop computer 780.

In some embodiments, multiple processors and/or multiple buses are combined, as appropriate, along with multiple memories and types of memory. Multiple computing devices may be connected, with each device providing portions of the necessary operations (e.g., as a server bank, a group of blade servers, or a multi-processor system). Examples of server systems for implementing the processes and methods described herein include, without limitation, cloud data centers with rack-mounted servers 764, blade server systems 774, etc.

In embodiments, different servers (optionally at different locations) carry out different steps or processes of the invention. For example, a segmentation server may be programmed and operable to manage the segmentation, a change event collection server may be programmed and operable to record raw change events from the change event data stream, a delegation server may be programmed and operable to obtain control of the subdomain of a domain owner or DNS-records server, a hosted zone build server may be programmed and operable to hold DNS records, a ESP-manager server may be programmed and operable to add and remove ESPs, and a database management server may be programmed and operable to manage the database for metrics.

In a preferred embodiment, the server may be configured as a server framework, cloud server, virtual machine, node cluster, or distributed computing system of servers or nodes to perform the steps, and serving to distribute workloads consisting of a high number of individualized, parallelizable tasks among the nodes in the cluster. A non-limiting example of a suitable distributed computing system is AWS by Amazon Web Services, Inc. (Seattle, WA). Indeed, the components shown here, their connections and relationships, and their functions, are meant to be exemplary only, and are not meant to limit implementations of the inventions described and/or claimed herein.

ALTERNATIVE EMBODIMENTS

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in another order than that specifically described above. Additionally, any of the components and steps described herein may be combined with one another in any logical manner except where such components or steps would be exclusive to one another. Accordingly, the scope and spirit of the invention should be judged in terms of the claims, which follow as well as the legal equivalents thereof.

What is claimed is:

1. A system for administering security protocols for sending bulk emails from at least one email sending provider (ESP) to an inbox server, the system comprises:

a backend server or computer framework comprising: one or more processors, and a memory coupled to the one or more processors, wherein the memory stores instructions that, when executed by the one or more processors, cause the backend server framework to implement a multilayer software architecture, wherein the multilayer software architecture includes a plurality of modules comprising:

an entity-register module configured to receive registration data including a subdomain;

a record-holder delegate module configured to delegate control of the subdomain from a DNS server to an intermediary;

a manage-ESP module for managing the subdomain to send the bulk email from the at least one ESP, wherein the manage-ESP module is configured to:

assign a different sub-subdomain to each of the at least one ESP;

adjust the number of ESPs to send the bulk email based on the assigned sub-subdomain; and administer security protocols for each ESP based on the assigned sub-subdomain and without updating the security protocols with the DNS server.

2. The system of claim 1, wherein the record-holder delegate module is programmed and operable to create a nameserver zone for holding DNS records for the subdomain.

3. The system of claim 2, wherein the record-holder delegate module is programmed and operable to send to the DNS server NS records of the at least one nameserver zone.

4. The system of claim 3, wherein the record-holder delegate module is programmed and operable to, after the NS records of the at least one nameserver zone has been uploaded to the DNS server, verify that the DNS server gives the name to the at least one nameserver zone.

5. The system of claim 4, wherein the record-holder delegate module is programmed and operable to verify by directly querying the nameserver zone instead of the DNS server.

6. The system of claim 1, wherein the security protocols comprise DNS records, and wherein the manage-ESP module is programmed and operable to administer by generating DNS records for each of said at least one ESP, after the DNS records are configured for the at least one ESP.

7. The system of claim 6, wherein the manage-ESP module is programmed and operable to administer by uploading the DNS records to the at least one nameserver zone.

8. The system of claim 7, wherein the DNS records comprise instructions for at least one of the following security protocols: SPF, DKIM, and DMARC.

9. The system of claim 1, wherein the server arrangement further comprises a content generator programmed and operable to create content for the bulk emails.

10. The system of claim 1, wherein the manage-ESP module is programmed and operable to administer by adding an ESP and generating security protocols for the added ESP without further updating the security protocols with the DNS server.

11. A computer-implemented method for administering security protocols for sending bulk email from at least one email sending provider (ESP) comprising:

receiving a name for a subdomain;

obtaining control, via a server or computer framework, of the subdomain from a DNS server to configure security protocols for the subdomain, wherein the obtaining control comprises creating at least one nameserver zone on a host server for holding DNS records for the subdomain;

assigning, via the server or computer framework, a unique sub-subdomain to each said at least one ESP; and administering, via the server or computer framework, the subdomain to send the bulk email from the at least one ESP, wherein the administering comprises configuring security protocols for each ESP based on the assigned sub-subdomain, the configuring including generating and uploading DNS records comprising SPF, DKIM, and DMARC for each assigned sub-subdomain to the hosted nameserver zone under control.

12. The method of claim 11, wherein the obtaining control comprises sending to the DNS server NS records containing a name of the at least one nameserver zone.

13. The method of claim 12, wherein the obtaining control comprises, after the NS records of the at least one nameserver zone has been uploaded to the DNS server, verifying that the DNS server gives the name to the at least one nameserver zone.

14. The method of claim 13, wherein the verifying is performed by directly querying the nameserver zone.

15. The method of claim 14, wherein the security protocols comprise DNS records, and wherein the administering comprises generating DNS records for each of said at least one ESP, after the DNS records are configured for the at least one ESP.

16. The method of claim 15, wherein the administering comprises uploading DNS records to the at least one nameserver zone.

17. The method of claim 16, wherein the DNS records comprise instructions for at least one of the following security protocols: SPF, DKIM, and DMARC.

18. The method of claim 17, wherein the administering comprises adding an ESP and generating security protocols for the added ESP without updating the security protocols with the DNS server.

19. A computer-implemented method for administering security protocols for sending bulk email from at least one email sending provider (ESP) comprising:

receiving, on a server, a name for a subdomain;

creating at least one nameserver zone for holding DNS records for the subdomain;

uploading, to a DNS server, nameserver records containing a name of the at least one nameserver zone;

verifying the DNS server gives the name to the at least one nameserver zone;

assigning, via the server, a unique nested subdomain to each of said at least one ESP;

administering, via the server, the subdomain to send the bulk email from the at least one ESP, wherein the administering comprises:

configuring security protocols for each of said at least one ESP based on the unique nested subdomain;

generating DNS records for each nested subdomain for each of said at least one ESP;

uploading the DNS records to the at least one nameserver zone without updating the security protocols with the DNS server;

generating content for the bulk email; and sending the content and instructions to each of the at least one ESP.

* * * * *